US012576952B2

(12) United States Patent
Kiji

(10) Patent No.: US 12,576,952 B2
(45) Date of Patent: Mar. 17, 2026

(54) SENSOR CALIBRATION SYSTEM FOR WATERCRAFT AND WATERCRAFT

(71) Applicant: HONDA MOTOR CO., LTD., Tokyo (JP)

(72) Inventor: Marudan Kiji, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 168 days.

(21) Appl. No.: 18/491,961

(22) Filed: Oct. 23, 2023

(65) Prior Publication Data

US 2025/0128798 A1 Apr. 24, 2025

(51) Int. Cl.
| | |
|---|---|
| *B63B 79/15* | (2020.01) |
| *B63B 49/00* | (2006.01) |
| *G01S 7/497* | (2006.01) |
| *G01S 17/87* | (2020.01) |
| *G05D 1/00* | (2024.01) |
| *G05D 1/243* | (2024.01) |
| *G01S 17/86* | (2020.01) |
| *G01S 17/89* | (2020.01) |
| *G01S 17/93* | (2020.01) |

(52) U.S. Cl.
CPC .............. *B63B 79/15* (2020.01); *B63B 49/00* (2013.01); *G01S 7/4972* (2013.01); *G01S 17/87* (2013.01); *G05D 1/0206* (2013.01); *G05D 1/2435* (2024.01); *G01S 17/86* (2020.01); *G01S 17/89* (2013.01); *G01S 17/93* (2013.01)

(58) Field of Classification Search
CPC ..................................................... G05D 1/0206
See application file for complete search history.

(56) References Cited

U.S. PATENT DOCUMENTS

| | | | |
|---|---|---|---|
| 11,243,539 B2 | 2/2022 | Kurokawa et al. | |
| 2015/0213059 A1* | 7/2015 | Ely | G06F 18/24 |
| | | | 382/103 |
| 2020/0042004 A1* | 2/2020 | Fujiyama | G05D 1/0206 |
| 2020/0293047 A1* | 9/2020 | Kurokawa | G05D 1/0206 |
| 2021/0094665 A1* | 4/2021 | Schmid | B63B 29/02 |
| 2022/0234490 A1* | 7/2022 | Traub | B63C 3/12 |
| 2022/0351523 A1* | 11/2022 | Kim | G06V 10/82 |

FOREIGN PATENT DOCUMENTS

JP 2020150459 A 9/2020

\* cited by examiner

*Primary Examiner* — Jason Holloway
*Assistant Examiner* — Alexandra R. Morford
(74) *Attorney, Agent, or Firm* — Armstrong Teasdale LLP

(57) ABSTRACT

A sensor calibration system (5) for watercraft (1), comprising: a primary environment sensor (7A, 8A) configured to detect an external object including a first or second region of the watercraft and a distance to the external object, and mounted to a part of the watercraft; and a processor (11) for processing an output of the primary environment sensor, wherein the processor is configured to identify a bow (1a) of the watercraft from the output of the primary environment sensor, and calibrate a position and an orientation of the primary environment sensor relative to the bow.

11 Claims, 21 Drawing Sheets

SENSOR CALIBRATION SYSTEM FOR WATERCRAFT AND WATERCRAFT

TECHNICAL FIELD

The present invention relates to a sensor calibration system for watercraft configured to calibrate the positions and orientations of a plurality of sensors mounted to the watercraft and watercraft.

BACKGROUND ART

In recent years, there have been active efforts to provide access to sustainable transportation systems that consider vulnerable people that can be found among transportation participants. For example, in order to further improve the safety and convenience of transportation means, research and development efforts have been directed to automatic piloting of various forms of watercraft.

In order to automatically pilot watercraft, various sensors are required to detect the external objects surrounding the own watercraft. JP2020-150459A is related to an image capturing system for watercraft that creates a bird's eye view of the surrounding environment by combining the images captured by a plurality of cameras. A plurality of index markers are placed on the parts of the watercraft so as to come into the views of the cameras, and the captured images are combined by making use of the index markers.

According to this prior art, the index markers are required to be affixed to various parts of the watercraft for the cameras to be properly calibrated. Affixing a number of index markers to various parts of the watercraft is unacceptably laborious. Furthermore, when the cameras are desired to be re-calibrated, the index markers are required to be affixed to the watercraft once again.

SUMMARY OF THE INVENTION

In view of such a problem of the prior art, a primary object of the present invention is to provide a sensor calibration system for watercraft and watercraft that allows the positions of sensors relative to the hull of the watercraft to be determined, and a calibration process to be performed according to the determined positions even when the sensors are installed on the watercraft after the watercraft has left the shipyard. Furthermore, the present invention contributes to the development of sustainable transportation systems.

In order to accomplish such a task, an aspect of the present invention provides a sensor calibration system (5) for a watercraft (1), comprising: a primary environment sensor (7A, 8A) configured to detect an external object including a first region of the watercraft and a distance to the external object, and mounted to a part of the watercraft; and a processor (11) for processing an output of the primary environment sensor, wherein the processor is configured to identify a bow (1a) of the watercraft from the output of the primary environment sensor, and calibrate a position and an orientation of the primary environment sensor relative to the bow.

Thereby, even when the primary environment sensor is retrofitted to the watercraft, an appropriate calibration of the position and orientation of the primary environment sensor can be achieved. Further, since no index marking is required to the affixed to the watercraft, the calibration work is simplified.

Preferably, in this sensor calibration system for a watercraft, the processor is configured to accept information on a width and length of the watercraft and compute the position of the primary environment sensor as a longitudinal distance from the bow (1a) to the primary environment sensor and a lateral distance from a longitudinal center line of the watercraft to the primary environment sensor.

Thereby, the position of the primary environment sensor can be determined in a well-defined manner.

Preferably, in this sensor calibration system for a watercraft, the primary environment sensor (8A) includes at least one of an image sensor and a LIDAR (7A).

By using pixel sensors such as an image sensor and a LIDAR for the primary environment sensor, the bow can be identified in an accurate and reliable manner.

Preferably, this sensor calibration system for a watercraft further comprises a secondary environment sensor (7B, 8B) positioned so as to detect a second region of the watercraft including a portion that overlaps with the first region of the watercraft detected by the primary environment sensor.

By combining the images acquired by multiple environment sensors according to the common part, a wide view range can be achieved so that the awareness of the environment can be maximized. The sensor calibration system of the present invention is particularly useful for automatic piloting, automatic berthing and other autonomous operation of watercraft.

Preferably, this sensor calibration system for a watercraft further comprises a pair of secondary environment sensors (7B) positioned on either side of the primary environment sensor wherein each of the pair of secondary environment sensors is configured to detect a respective second region of the watercraft, and wherein the respective second regions include portions that are common to the first region of the watercraft detected by the primary environment sensor.

Thereby, a particularly wide view range can be achieved so that the awareness of the environment can be maximized.

Preferably, in this sensor calibration system for a watercraft, the first region of the watercraft detected by the primary environment sensor and the second region of the watercraft detected by the secondary environment sensor include an outer edge of a hull of the watercraft.

Thereby, a wide range of the surrounding environment can be covered by the environment sensors.

Preferably, in this sensor calibration system for a watercraft, the processor is configured to detect an outwardly bulging portion of the outer edge of a hull of the watercraft as the bow.

Since the bow of watercraft typically consists of an outwardly bulging portion of the outer edge of the hull of the watercraft, the bow can be identified in a reliable manner.

Preferably, in this sensor calibration system for a watercraft, the processor is configured to detect a symmetrically tapered portion of the outer edge of a hull of the watercraft as the bow.

Since the bow of watercraft typically consists of a symmetrically tapered portion of the outer edge of the hull of the watercraft, the bow can be identified in a reliable manner.

Preferably, in this sensor calibration system for a watercraft, wherein the processor is configured to detect a middle point of a laterally extending linear portion of the outer edge of a hull of the watercraft as the bow.

Since some watercraft such as pontoons are provided with a flat bow, this aspect of the present invention allows the bow of a side range of watercraft to be detected in a reliable manner.

Preferably, in this sensor calibration system for a watercraft, the processor is configured to analyze a shape of the outer edge of a hull of the watercraft and detect the bow according to a knowledge database.

By accumulating data of existing watercraft and suitably teaching the processor, the processor can be enabled to identify a bow in a reliable manner without regard to the type of watercraft that is involved.

Preferably, in this sensor calibration system for a watercraft, the processor is configured to create an environment map of an area surrounding the watercraft according to the output of the primary environment sensor.

Thereby, the environment map can be created in an accurate manner so that automatic piloting, automatic berthing and other autonomous operation of the watercraft can be performed in a reliable manner.

In order to accomplish the above mentioned task, another aspect of the present invention provides watercraft (1) provided with a sensor calibration system (5), the sensor calibration system comprising: a primary environment sensor (7A, 8A) configured to detect an external object including a first region of the watercraft and a distance to the external object, and mounted to a particular part of the watercraft; and a processor (11) for processing an output of the primary environment sensor, wherein the processor is configured to identify a bow (1a) of the watercraft from the output of the primary environment sensor, and calibrate a position and an orientation of the primary environment sensor relative to the bow.

Thereby, even when the primary environment sensor is retrofitted to the watercraft, an appropriate calibration of the position and orientation of the primary environment sensor can be achieved. Further, since no index marking is required to the affixed to the watercraft, the calibration work is simplified.

Effect of the Invention

The present invention thus provides a sensor calibration system for watercraft and watercraft that allows the positions of sensors relative to the hull of the watercraft to be determined, and a calibration process to be performed according to the determined positions without requiring to affix index markings on the watercraft.

DESCRIPTION OF THE PREFERRED EMBODIMENT(S)

The present invention will be described in the following in terms of specific embodiments with reference to the appended drawings.

First Embodiment

Figure 1:
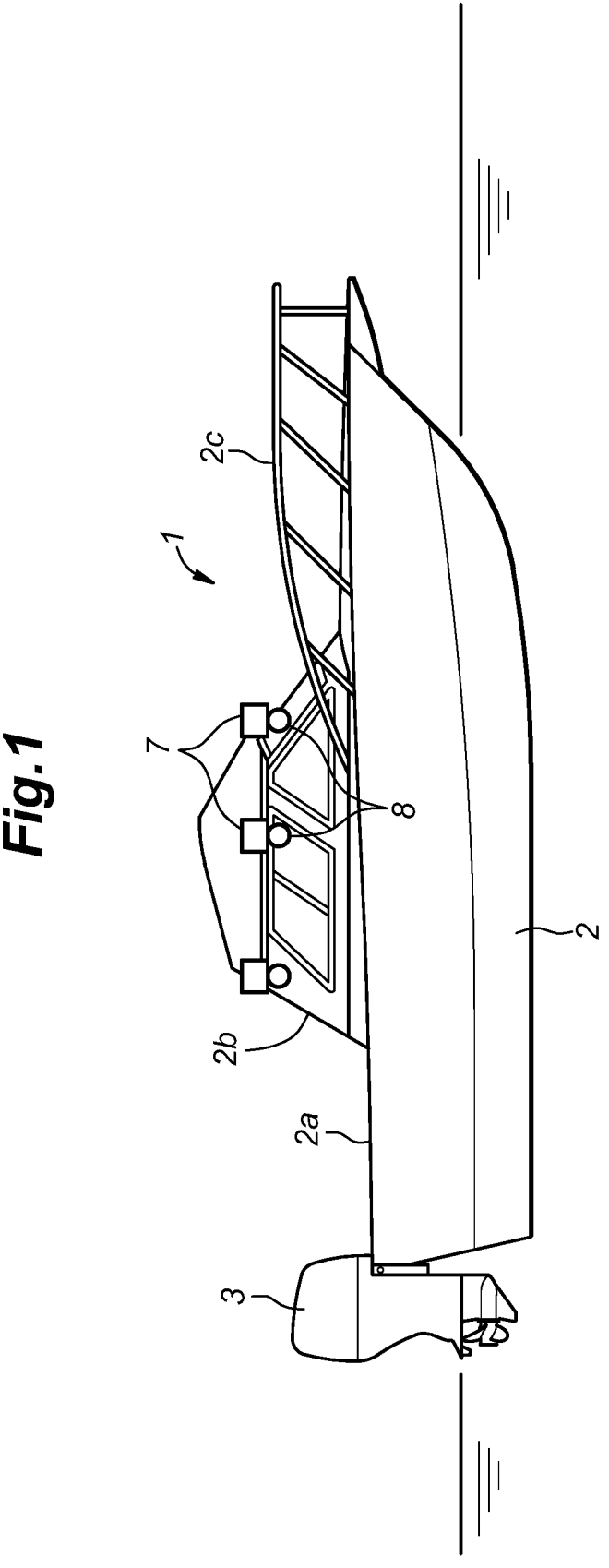
FIG. 1 is a side view of a boat according to a first embodiment of the present invention.
Figure 2:
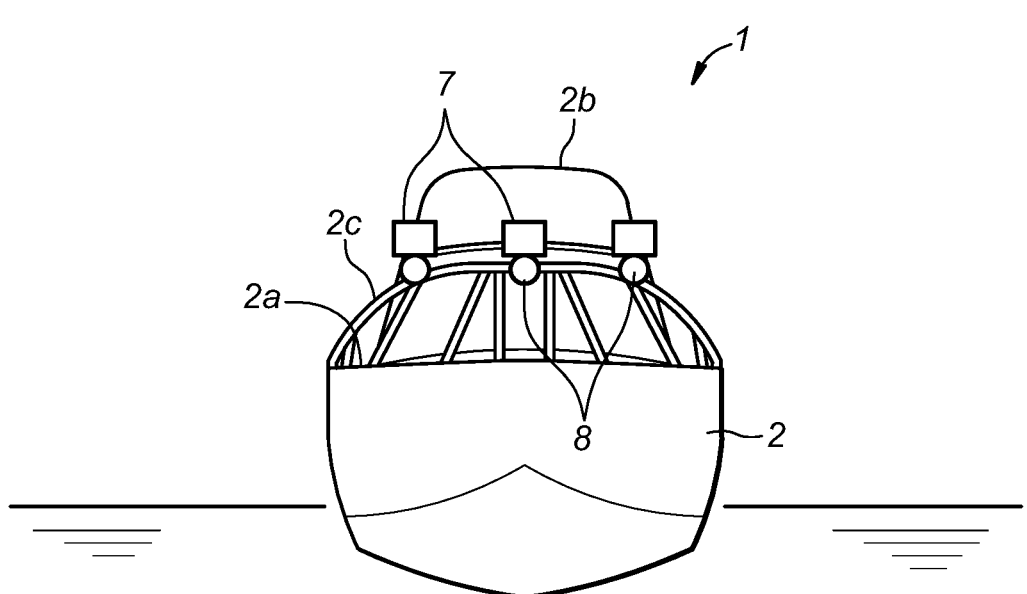
FIG. 2 is a front view of the boat.
Figure 3:
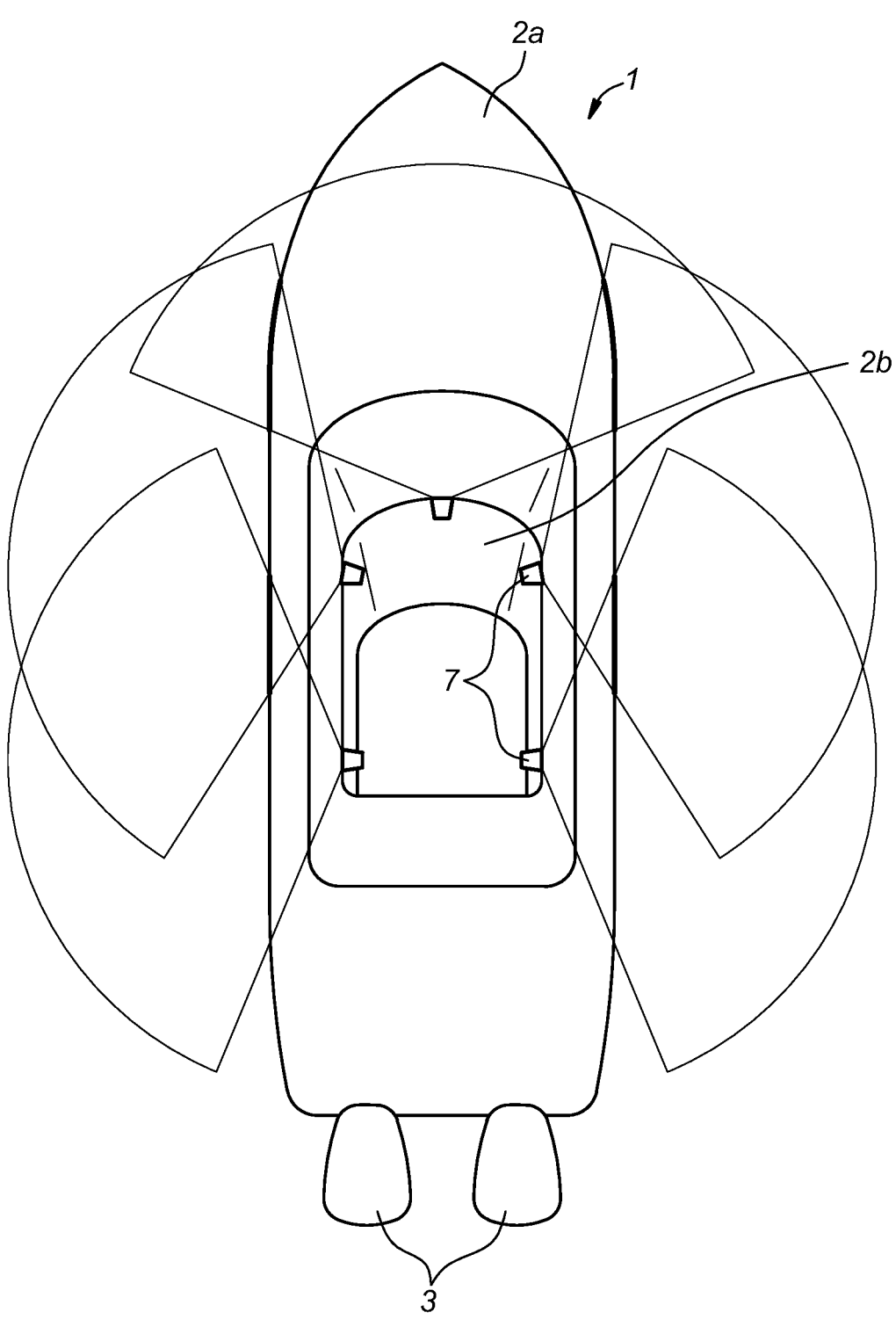
FIG. 3 is a top view of the boat.

The first embodiment of the present invention will be described in the following with reference to FIGS. 1 to 20. As shown in FIGS. 1 to 3, watercraft consisting of a boat 1 includes a hull 2 and a pair of outboard motors 3 attached to the stern of the hull 2. The hull 2 is elongated in the longitudinal direction, and includes a deck 2a, a cabin 2b provided generally in a central part of the deck 2a, and a handrail 2c provided along the outer edge of the deck 2a. An operator's seat is provided inside the cabin 2b. Each outboard motor 3 is provided with a propeller (propeller) submerged in the water, and is attached to the hull 2 so that it can be steered around a vertical steering axis and selectively tilted up around a horizontal tilt axis.

Figure 4:
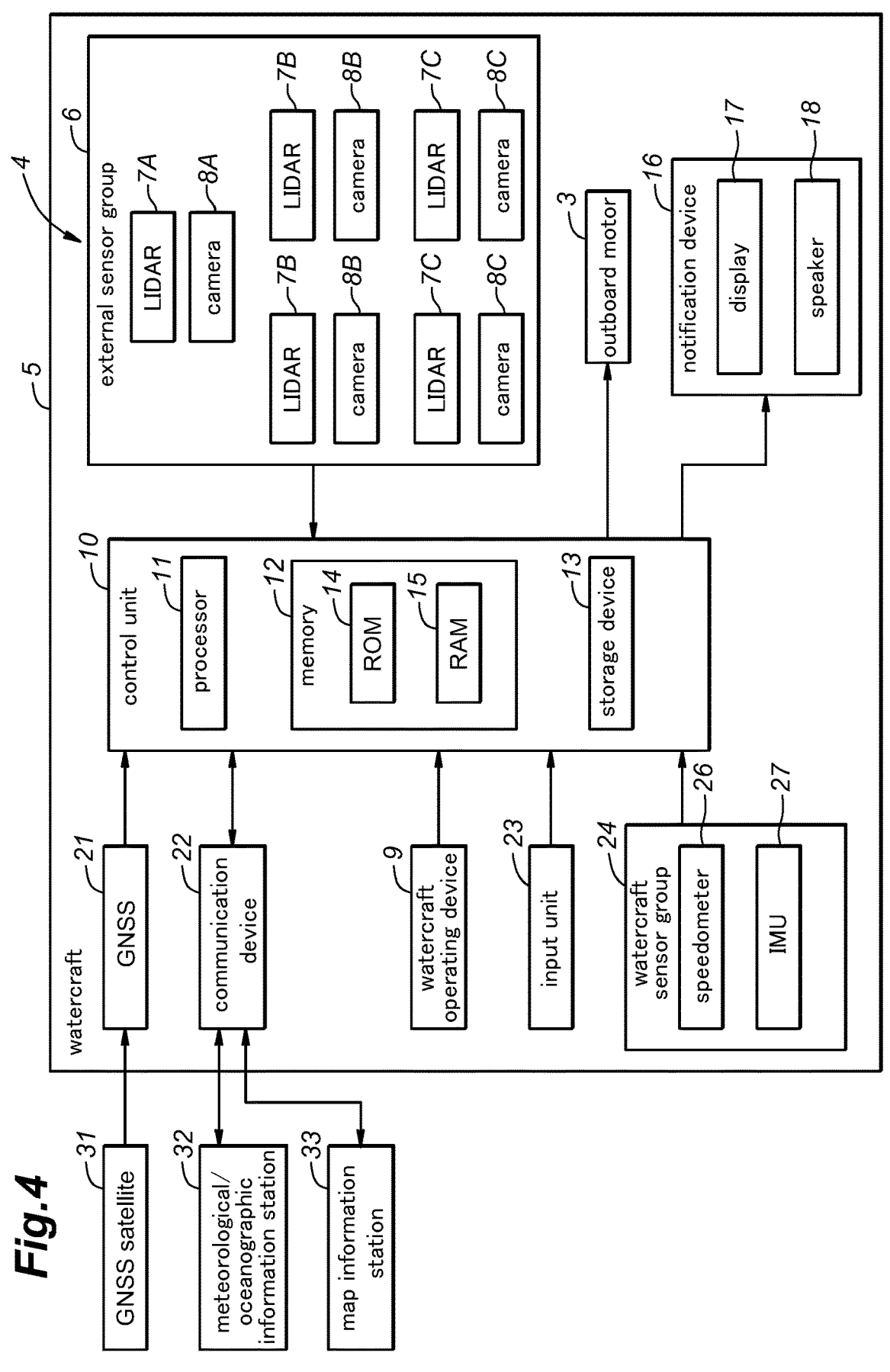
FIG. 4 is a block diagram of an automatic berthing system to which the sensor calibration system of the present invention is applied.

The boat 1 is equipped with an automatic berthing system that automatically docks the boat 1 by detecting objects around the hull 2. FIG. 4 is a schematic diagram of the automatic berthing system. As shown in FIG. 4, the automatic berthing system includes an external sensor group 6 and a control unit 10 that processes the output of the external sensor group 6 and controls the motion of the outboard motors 3. In this embodiment, as the external sensor group 6, five LIDARs 7 (Laser Imaging Detection and Ranging; 7A, 7B, 7B, 7C, 7C) and five cameras 8 (8A, 8B, 8B, 8C, 8C) are installed at positions higher than the deck 2a of the hull 2, for instance in an upper part of the cabin. 2b. As the external sensor group 6, one or more radars may be additionally attached to an upper part of the cabin 2b.

Each LIDAR 7 detects objects existing around the boat 1 by irradiating the area around the boat 1 with laser light and detecting the reflected waves. The LIDAR 7 can detect the object's relative position (i.e., the distance and direction from the LIDAR 7) and the size of the object. Thus, the LIDAR 7 is a ranging sensor that detects objects around boat 1 as obstacles. The LIDAR 7 is configured as a pixel image sensor.

Each camera 8 captures an image of objects existing around the boat 1. The camera 8 is configured as a pixel image sensor. The images taken by the cameras 8 are analyzed and used to determine the types of objects existing around the boat 1. Thus, the cameras 8 also function as obstacle identification devices that detect obstacles around the boat 1.

Adjacent to the operator's seat of the boat 1 is provided a watercraft operating device 9 for operating the outboard motors 3. The watercraft operating device 9 includes a steering wheel for changing the traveling direction of the boat 1 by rotating the outboard motors 3 around a vertical axis, and a remote controller for changing the propulsion force of the boat 1. The steering wheel is configured to be operated by a user and may be steer-by-wire, cable-type, or other mechanical type. The remote controller is configured to be operated by a user, and may be of a lever or dial type, for example.

Also, the boat 1 is equipped with a control unit 10. The control unit 10 is an electronic control unit essentially consisting of a computer, which includes a processor 11 such as a central processing unit (CPU), memory 12, and a storage device 13, and is configured to execute predetermined arithmetic processing. The memory 12 comprises read only memory (ROM 14) and random access memory (RAM 15). The storage device 13 may be a hard disk drive (HDD), solid state drive (SSD), or the like. The storage device 13 stores a map or a chart of the surrounding body of water. The control unit 10 is programmed so that the processor 11 reads necessary data and application software from the storage device 13 and executes a predetermined arithmetic processing according to the application software.

The control unit 10 controls the outboard motors 3 based on an input to the watercraft operating device 9. More specifically, the control unit 10 controls the outboard motors 3 according to the steering amount of the steering wheel so that the propeller may be oriented in a corresponding direction. Further, the control unit 10 controls the outboard motors 3 so that the propeller generates a corresponding propulsion force according to the operating amount of the operating device 9. Further, the control unit 10 controls the tilt drive unit so that the propeller is submerged in the water or raised in the air according to the operation of a tilt switch (not shown in the drawings).

In addition, a notification device 16 is mounted in the cabin of the boat 1. The notification device 16 has a display 17 and a speaker 18. The notification device 16 is connected to and controlled by the control unit 10. The display 17 has a screen displaying various pieces of information about the boat 1 and a guidance screen of the navigation device. Objects (obstacles) around the boat 1 (other ships, breakwaters, piers, etc.) are displayed on the guidance screen of the navigation device. It should be noted that the control unit 10 may be configured as a piece of hardware, or may be configured as a unit composed of a plurality of pieces of hardware.

Furthermore, the boat 1 is equipped with a satellite positioning system (GNSS 21), a communication device 22, an input unit 23, a watercraft sensor group 24, and an external sensor group 6. The watercraft sensor group 24 includes a speedometer 26, and an IMU 27 (Inertial Measurement Unit). The GNSS 21, the communication device 22, the input unit 23, the watercraft sensor group 24 and the external sensor group 6 are connected to the processor 11.

The GNSS 21 receives information such as satellite positions and transmission times transmitted from a plurality of GNSS satellites 31, and determines the position of the GNSS 21 by computation using such information. In other words, the GNSS 21 is a current position detection device that detects the current position of the boat 1.

The communication device 22 performs wireless communication with other watercraft and base stations according to a command from the control unit 10. The communication device 22 comprises a transmission antenna and a reception antenna. The communication device 22 can transmit information including the position of the boat 1 to the outside using the transmitting antenna.

The communication device 22 receives meteorological and oceanographic information from a meteorological/oceanographic information station 32 via the receiving antenna. If the boat 1 is navigating on a river, the communication device 22 may receive river information instead of or in addition to oceanographic information.

In addition, the communication device 22 receives up-to-date map information from a map information station 33 or a regional information station provided in a marina or the like via the receiving antenna. The map information may include information on obstacles 34 (see FIG. 14) on the water which may include the positions and shapes of piers P, breakwaters and others which may be either natural or manmade. The up-to-date map information received by the communication device 22 is written over the old map data stored in the storage device 13.

The control unit 10 generates a composite map by superimposing the environment information acquired by the external sensor group 6 on the map stored in the storage device 13. The external sensor group 6 may include the external cameras 8 (for visible light and infrared light), the LIDARs 7, the radars or the like. The control unit 10 superimposes the obstacles 34 acquired by the external sensor group 6 on the map, and distinguishes the kinds of obstacles 34 (water surface, sky, own watercraft, other watercraft, piers P, harbors, beaches, trailers and other obstacles) according to the attributes of the various regions in the image acquired by the external sensor group 6 according to the attributes of the different regions.

The input unit 23 is provided in the cabin adjacent to the operator's seat and receives input of commands relating to automatic berthing of the boat 1 performed by the automatic berthing system. Commands related to automatic boat berthing include the start of guidance, setting a target position for automatic boat berthing, setting the heading of the own boat at the target position, setting the start of automatic boat berthing, the termination of automatic boat berthing, and the like. The input unit 23 may include buttons and a joystick provided near the display 17. The display 17 may be configured as a touch panel that serves as the input unit 23 or a part thereof.

The control unit 10 is configured to control the outboard motors 3 upon receiving a command to start an automatic watercraft berthing operation from the input unit 23 so that the boat 1 advances along the predetermined route set by the control unit 10.

The speedometer 26 in the watercraft sensor group 24 detects the sailing speed of the boat 1 (relative speed with respect to the water). The sea current (direction and speed of the surrounding water) can be obtained from the difference between the speed detected by the speedometer 26 and the absolute moving speed of the boat 1 (which may be acquired by the GNSS 21). The IMU 27 detects the rotation of the boat 1 around the three axes and the acceleration in the three axial directions. The rotations and accelerations detected by the IMU 27 represent the rotational and translational movements of the part of the hull where the IMU 27 is installed. The detection result of the IMU 27 is used to eliminate the influence of the rocking and other spurious movement of the boat 1 from the output of the external sensor group 6. Therefore, it is preferable that the IMU 27 is positioned near the external sensor group 6.

The control unit 10 controls the outboard motors 3 according to the input to the watercraft operating device 9 for manual operation, and also controls the outboard motors 3 according to the input to the watercraft operating device 9 for an automatic berthing operation. More specifically, when the input unit 23 receives a designation of a target berthing spot, and an input for initiating the automatic watercraft berthing operation, the control unit 10 controls the outboard motors 3 to move the boat 1 from the current position which is designated as the start position to the target berthing spot according to a prescribed automatic control principle which may be referred to as automatic watercraft piloting control. The control unit 10 may designate a position which is arbitrarily selected by the user as the start position, instead of the current position of the boat 1.

The automatic berthing system may be retrofitted to the boat 1. More specifically, the external sensor group 6, control unit 10, etc. that constitute the automatic berthing system may be retrofitted to the existing boat 1. The control unit 10 may be provided with an automatic berthing capability and a sensor calibration mechanism, which will be described later, by adding a program to the existing device of the boat 1. The input unit 23, the notification device 16, etc. may consist of those that are originally installed, or may be installed later.

Figure 5:
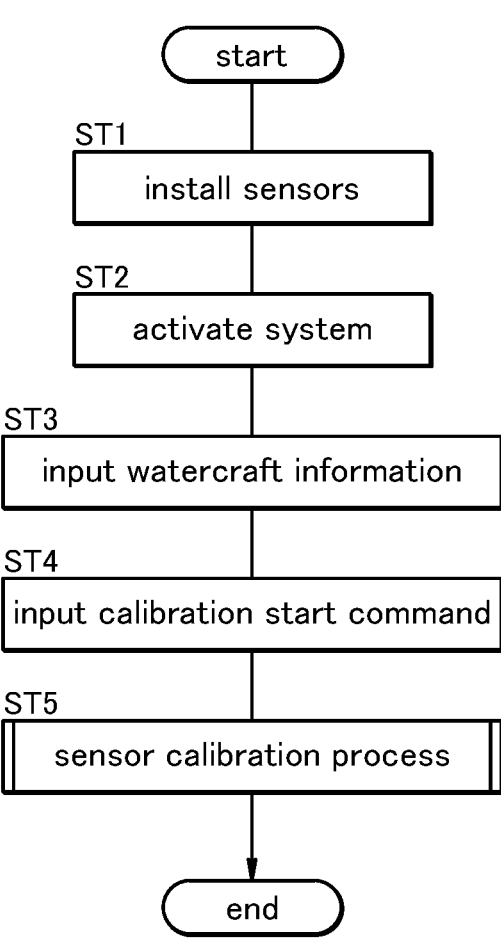
FIG. 5 is a flowchart of a system installation process.

FIG. 5 is a flowchart of the system installation process. As shown in FIG. 5, an operator attaches the external sensor group 6 to the hull 2 (step ST1). More specifically, the operator attaches the external sensor group 6 such as the LIDARs 7 and the cameras 8 to positions higher than the deck 2a of the hull 2 (see FIGS. 1 and 2) such as upper parts of the cabin 2b.

At that time, the operator attaches one of the LIDARs 7 in such an orientation as to detect the bow of the ship. This process may be automated to be performed by the processor 11. Hereinafter, this LIDAR 7 will be referred to as a primary LIDAR 7A. The operator also attaches two additional LIDARs 7 (hereinafter referred to as secondary LIDARs 7B) to the hull 2 on either side of the primary LIDAR 7A so as to commonly detect parts of the outer edge of the hull 2 (namely, the outmost line defined by the deck 2a, cabin 2b or the handrail 2c) that the primary LIDAR 7A detected. Furthermore, the operator installs two additional LIDARs 7 (hereinafter, referred to as tertiary LIDARs 7C) to the hull 2 behind the secondary LIDARs 7B so as to commonly detect parts of the outer edge of the hull 2 that the secondary LIDARs 7B detected. When installing six or more LIDARs 7, the operator similarly installs additional LIDARs behind the tertiary LIDARs 7C in such a manner that the parts of the outer edge of the hull 2 detected by the adjacent LIDARs 7 can be commonly detected. The edge parts commonly detected by the adjacent LIDARs 7 are indicated by bold lines in FIG. 3 as common outer edge parts 36.

Similarly, the operator attaches one of the cameras 8 in such a manner as to detect (capture the image of) the bow of the ship. Hereinafter, this camera 8 will be referred to as a primary camera 8A. The operator also attaches two additional cameras 8 (hereinafter referred to as secondary cameras 8B) to the hull 2 on either side of the primary camera 8A so as to commonly detect parts of the outer edge of the hull 2 detected by the primary camera 8A. Furthermore, the operator places two additional cameras 8 (hereinafter referred to as tertiary cameras 8C) behind these secondary cameras 8B so as to commonly detect parts of the outer edge of the hull 2 detected by the secondary cameras 8B. When installing six or more cameras 8, the operator similarly places the cameras 8 behind the tertiary cameras 8C on the hull 2 so that the parts of the outer edge of the hull 2 detected by the adjacent cameras 8 are commonly detected.

After the external sensor group 6 is attached to the hull 2, it is wired to the control unit 10. Power supply to the external sensor group 6 is controlled by the control unit 10. The external sensor group 6 is controlled by the control unit 10 and forwards the detection results to the control unit 10. The outboard motors 3 are also wired to the control unit 10 such that the thrust and the steering angle of each outboard motor 3 are controlled by the control unit 10. The control unit 10 is configured to automatically navigate or pilot the boat 1 with the aid of the GNSS 21.

The mounting positions and mounting angles of the LIDARs 7 and the cameras 8 will vary depending on the configuration of the boat 1 to which they are mounted. In order for the control unit 10 to correctly utilize the output of the external sensor group 6, the relative positions and relative angles of the sensors in the external sensor group 6 with respect to the hull 2 are required to be known. Therefore, for the automatic berthing system installed on the boat 1 to operate correctly, it is necessary to perform a sensor calibration process to accurately identify external objects for the given mounting positions and mounting angles of the sensors of the external sensor group 6.

Thus, after installing and wiring the external sensor group 6 (step ST1), the operator starts up the system (step ST2) and inputs the hull information into the system using the input unit 23 (step ST3). The hull information includes the length, width and height of the hull 2. In particular, when detecting the outer edge of the hull 2 of the watercraft, only a predetermined height range from the sensor may be required to be searched as the outer edge of the hull 2 of the watercraft owing to the height information of the watercraft. If the height of the watercraft (the height from the bottom of the watercraft to the cabin roof, or the height from the deck 2a to the cabin roof) is known, one can determine a height range from the sensor within which the outer edge of the hull 2 of the watercraft is expected to be located. Therefore, it is possible to prevent low-lying ground or sea surfaces from being mistaken for the deck 2a of the watercraft, and to reduce the calculation load.

The inputted hull information is stored in the storage device 13 of the control unit 10. In other words, the storage device 13 serves as a hull information storage portion that stores the hull information. Furthermore, the storage device 13 stores installation position information of the sensors of the external sensor group 6, which will be described later. Subsequently, the operator inputs a calibration start command into the system by using the input unit 23 (step ST4). This causes the system to initiate a sensor calibration process (step ST5).

In the automatic berthing system of this embodiment, the control unit 10 is configured to automatically execute a sensor calibration process. Therefore, there is no need for the user or the operator to accurately measure the mounting positions and mounting angles of the various sensors belonging to the external sensor group 6 or to input these values into the system.

Figure 6:
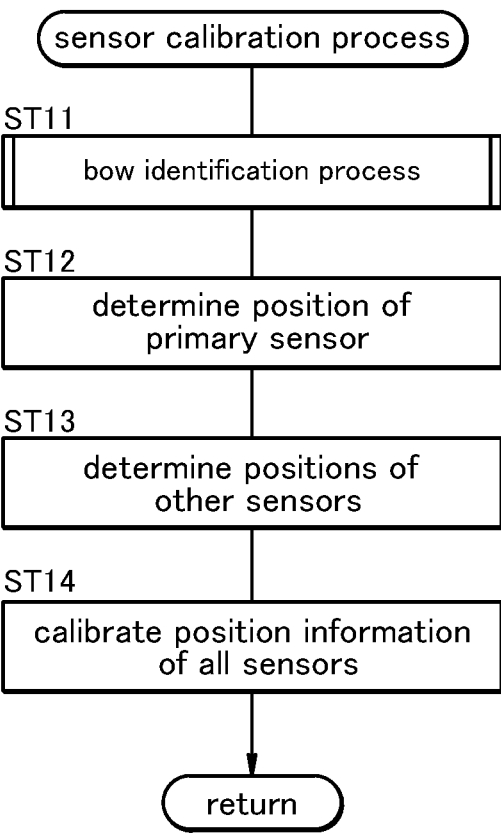
FIG. 6 is a flowchart of a system calibration process.

The sensor calibration process performed by the control unit 10 will be described in the following with reference to FIGS. 6 to 10. FIG. 6 is a flowchart of the sensor calibration process. As shown in FIG. 6, in the sensor calibration process, the control unit 10 first executes a bow identification process (step ST11).

The control unit 10 executes this bow identification process for all of the LIDARs 7. Preferably, in this bow identification process, the control unit 10 may be configured to use a sensor fusion technique that combines the outputs of the LIDARs 7 and the cameras 8 so that the bow 1a of the boat 1 may be identified in a particularly accurate manner. More specifically, the control unit 10 determines the shape of the front part of the hull 2 based on the output of the cameras 8 and LIDARs 7, and identifies the bow 1a by analyzing the shape of the outer edge of the hull 2. Thereby, the control unit 10 can identify the bow 1a of the hull 2 from the output of the cameras 8 and LIDARs 7 without regard to the particular shape of the bow 1a, and the versatility of the system is improved.

Figure 7:
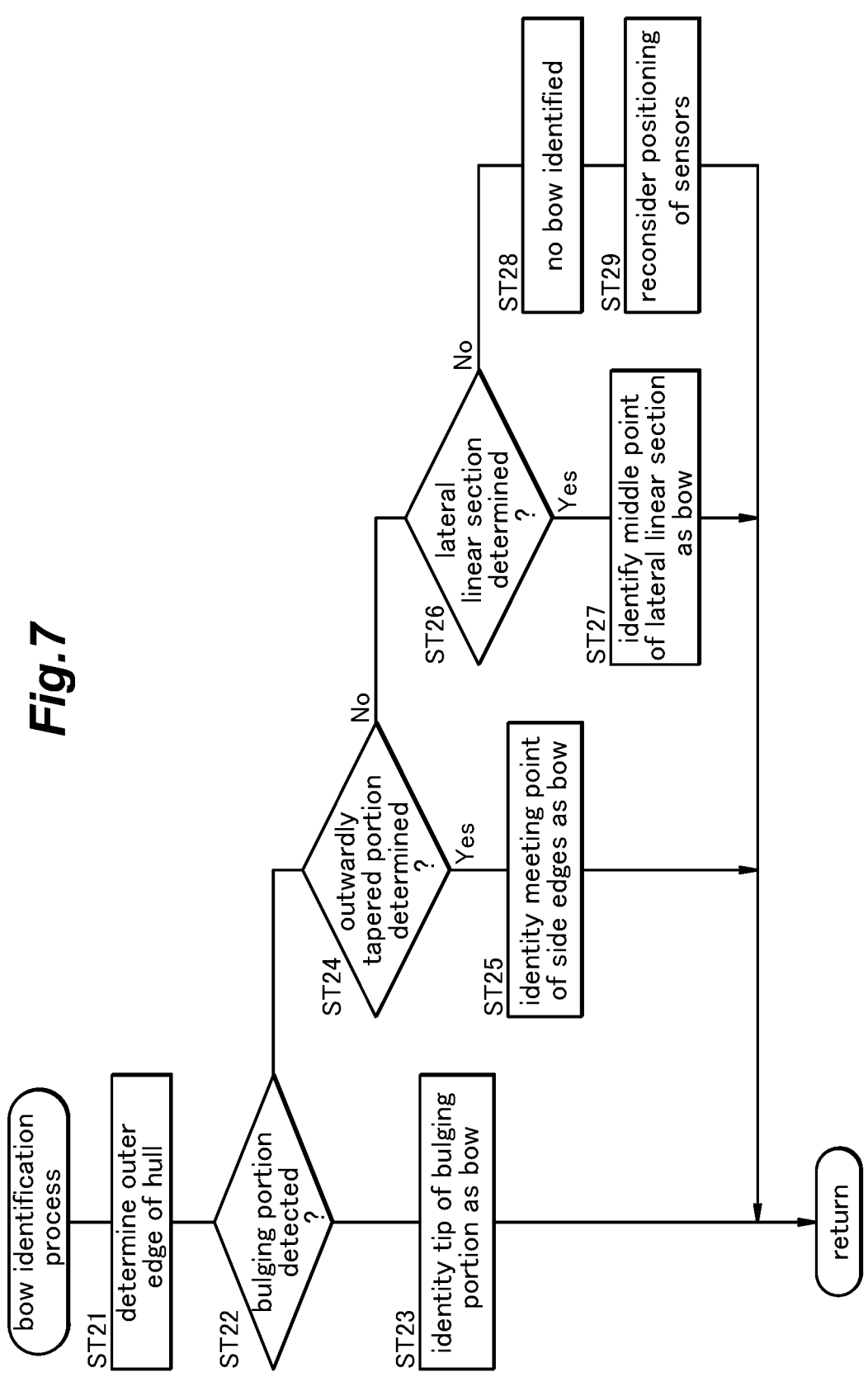
FIG. 7 is a flowchart of a bow identification process.

FIG. 7 is a flowchart of the bow identification process. As shown in FIG. 7, in the bow identification process, the control unit 10 first determines the outer edge of the hull 2 based on the detection result of the LIDARs 7 (step ST21).

Figure 8:
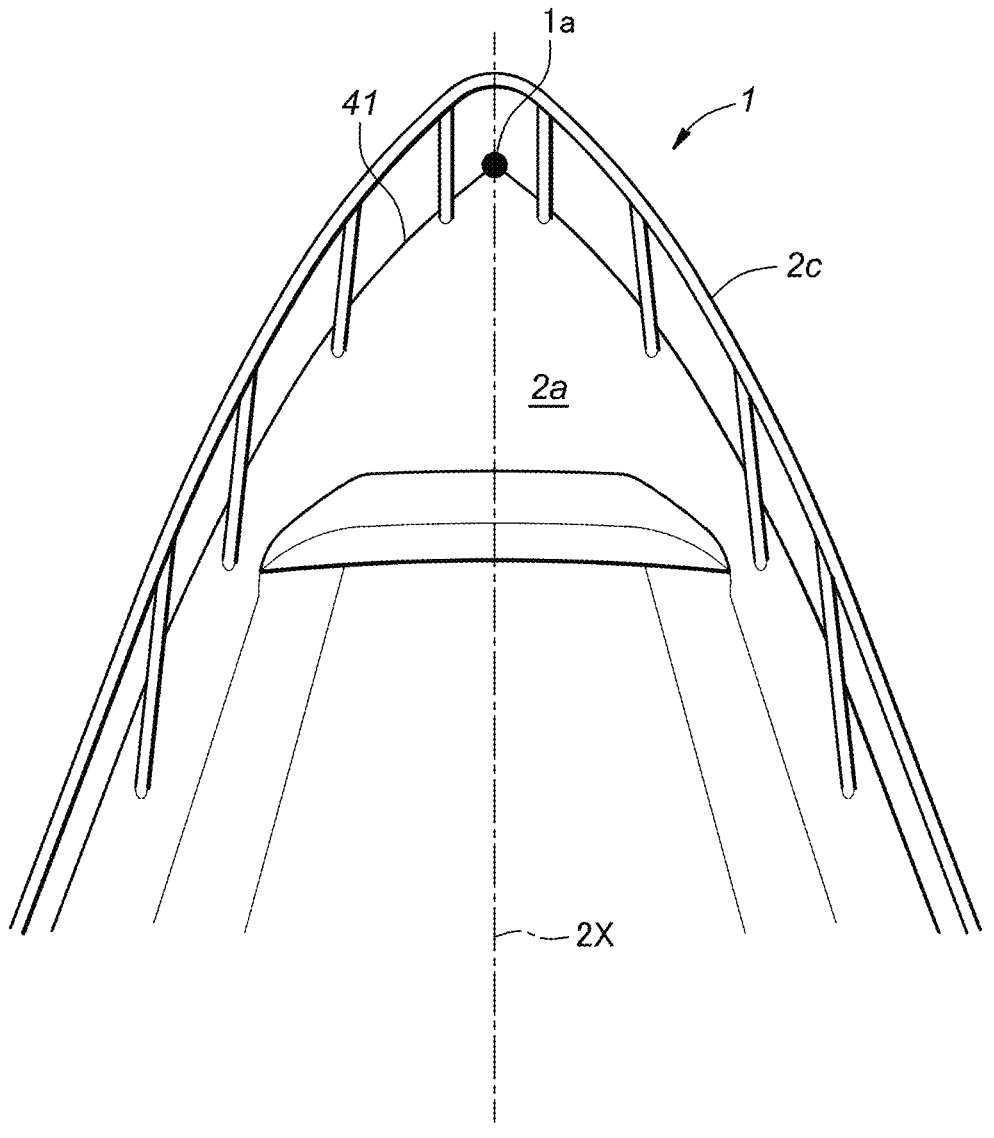
FIG. 8 is a first example of a detected bow.

Thereafter, the control unit 10 determines if there is a bulging portion 41 in the outer edge of the hull 2 (step ST22). Here, the bulging portion 41 is a portion where the outer edge of the hull 2 bulges in a direction away from the LIDARs 7, or toward the outside of the boat 1. The bulging portion 41 is then identified as the bow 1a of the boat 1. FIG. 8 is a schematic view showing a first example of the detected bow 1a. As shown in FIG. 8, when there is a bulging portion 41 on the outer edge of the hull 2 that satisfies the predetermined condition for being the bow 1a(ST22: Yes), the control unit 10 identifies the tip of the bulging portion 41 as the bow B (step ST23), and the bow identification process is ended.

Figure 9:
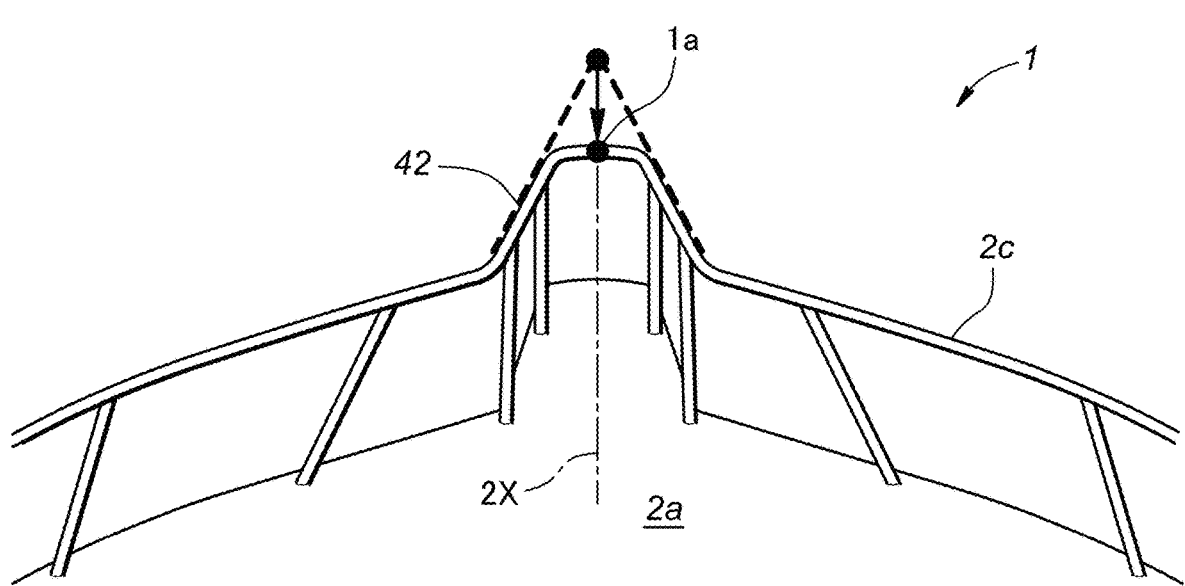
FIG. 9 is a second example of a detected bow.

If no bulging portion 41 is found on the outer edge of the hull 2 that satisfies the predetermined condition for being the bow 1a (ST22: No), the control unit 10 next determines if there is a symmetrical tapered portion 42 on the outer edge of the hull 2 (step ST24). Here, the symmetrical tapered portion 42 is a portion of the outer edge that tapers, as one moves away or forward from the LIDAR 7, in a symmetric configuration. FIG. 9 is a schematic drawing showing a second example of the detected bow 1a. As shown in FIG. 9, when there is a symmetrical tapered portion 42 on the outer edge of the hull 2 that satisfies a predetermined condition corresponding to the bow 1a (ST24: Yes), the control unit 10 extends the side edges of the symmetrical tapered portion 42 forward. The point of the outer edge of the hull 2 which is closest to the intersection of the side edges of the symmetrical tapered portion 42 is identified as the bow 1a (step ST25), and the bow identification process is ended.

Figure 10:
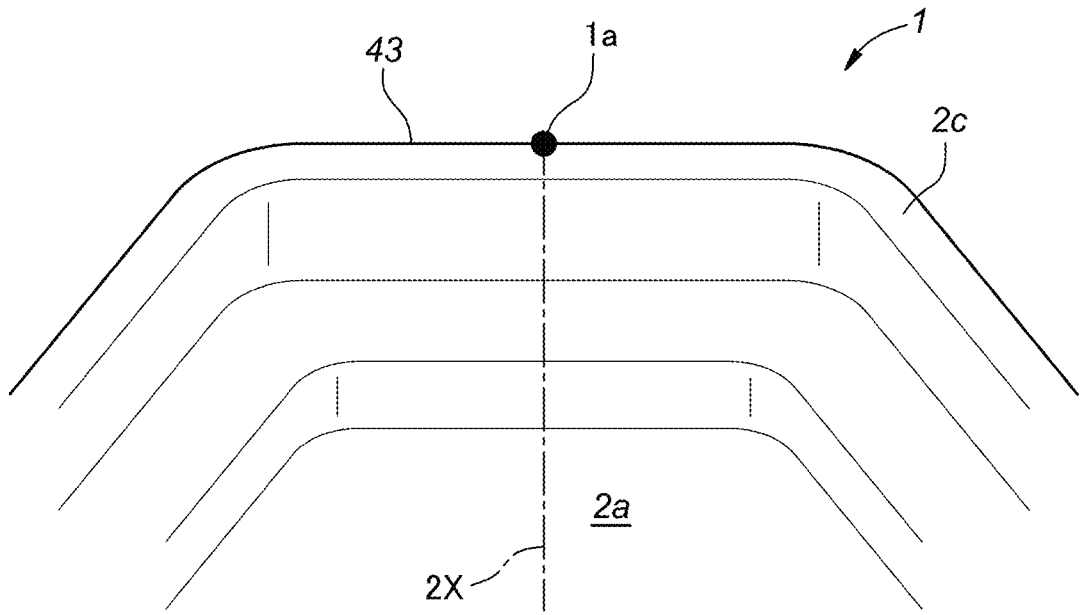
FIG. 10 is a third example of a detected bow.

If the outer edge of the hull 2 does not have a symmetrical tapered portion 42 that satisfies the predetermined condition (ST24: No), the control unit 10 next determines if there is a lateral linear section 43 in the outer edge of the forward part of the hull 2 (step ST26). FIG. 10 is a schematic drawing showing a third example of the detected bow 1a. As shown in FIG. 10, if there is a lateral linear section 43 on the front edge of the hull 2 that satisfies the predetermined condition (ST26: Yes), the control unit 10 determines the middle point of the lateral linear section 43 as the bow 1a (step ST27), and the bow identification process is ended.

If there is no lateral linear section 43 on the outer edge of the hull 2 that satisfies the predetermined condition corresponding to the bow 1a (ST26: No), the control unit 10 determines that there is no bow 1a in the detection result of the LIDARs 7 (step ST28), and issues an error notification to prompt the user to review the positioning of the sensors before this routine is concluded (step ST29).

Alternatively or additionally, the processor 11 may be configured to analyze a shape of the outer edge of the watercraft and detect the bow 1a according to a knowledge database which may generated by accumulating data of existing watercraft, and suitably teaching the processor 11.

Thereby, the processor 11 can be enabled to identify a bow 1a in a reliable manner without regard to the type of watercraft that is involved.

Returning to FIG. 6, following the bow identification process in step ST11, the control unit 10 identifies the LIDAR 7 that detected the bow 1a, and specifies the position and orientation of this LIDAR 7 (step ST12). This LIDAR 7 is designated as the primary LIDAR 7A. More specifically, the control unit 10 determines the longitudinal distance between the bow 1a and the primary LIDAR 7A in the longitudinal direction, and the lateral distance between the center line of the hull 2 (hereinafter referred to as the hull center line 2X) and the primary LIDAR 7A based on the detection results of the primary LIDAR 7A. The installation position information of the primary LIDAR 7A with respect to the bow 1a including the longitudinal distance to the bow 1a, the lateral distance to the hull centerline 2X, and the lateral angle is calculated and identified.

Next, the control unit 10 determines the positions and orientations of the other LIDARs 7, such as the secondary LIDARs 7B and the tertiary LIDARs 7C (step ST13). More specifically, based on the detection result of the primary LIDAR 7A, the control unit 10 looks for the LIDARs 7 that partly share the image of the outer edge of the hull 2 with the primary LIDAR 7A. The LIDARs 7 that partly share the image of the outer edge of the hull 2 with the primary LIDAR 7A are extracted, and by matching the images of the outer edge of the hull 2 with that obtained by the primary LIDAR 7A, the secondary LIDARs 7B are identified, and the positions and the orientations of the secondary LIDARs 7B are determined.

Thereafter, the control unit 10 looks for the LIDARs 7 that partly share the image of the outer edge of the hull 2 with the secondary LIDARs 7B. The LIDARs 7 that partly share the image of the outer edge of the hull 2 with the secondary LIDAR 7B are extracted, and by matching the images of the outer edge of the hull 2 with those obtained by the secondary LIDAR 7B, the tertiary LIDARs 7C are identified, and the positions and the orientations of the tertiary LIDARs 7C are determined. If there are quaternary LIDARs, the positions and the orientations thereof are determined in a similar fashion.

In this process of determining the positions and orientations of the LIDARs 7, if the control unit 10 fails to connect the images obtained by the LIDARs 7, a notification is made on the display 17 prompting the user to review the positioning of the LIDARs 7 and make necessary changes.

Once the images obtained by the LIDARs 7 are properly connected to one another, the control unit 10 is able to obtain a consistent overall view of the environment surrounding the boat 1 by calibrating the position information of the sensors or LIDARs 7 (ST14).

The automatic berthing operation performed by the control unit 10 will be described in the following with reference to FIGS. 11 to 20.

Figure 11:
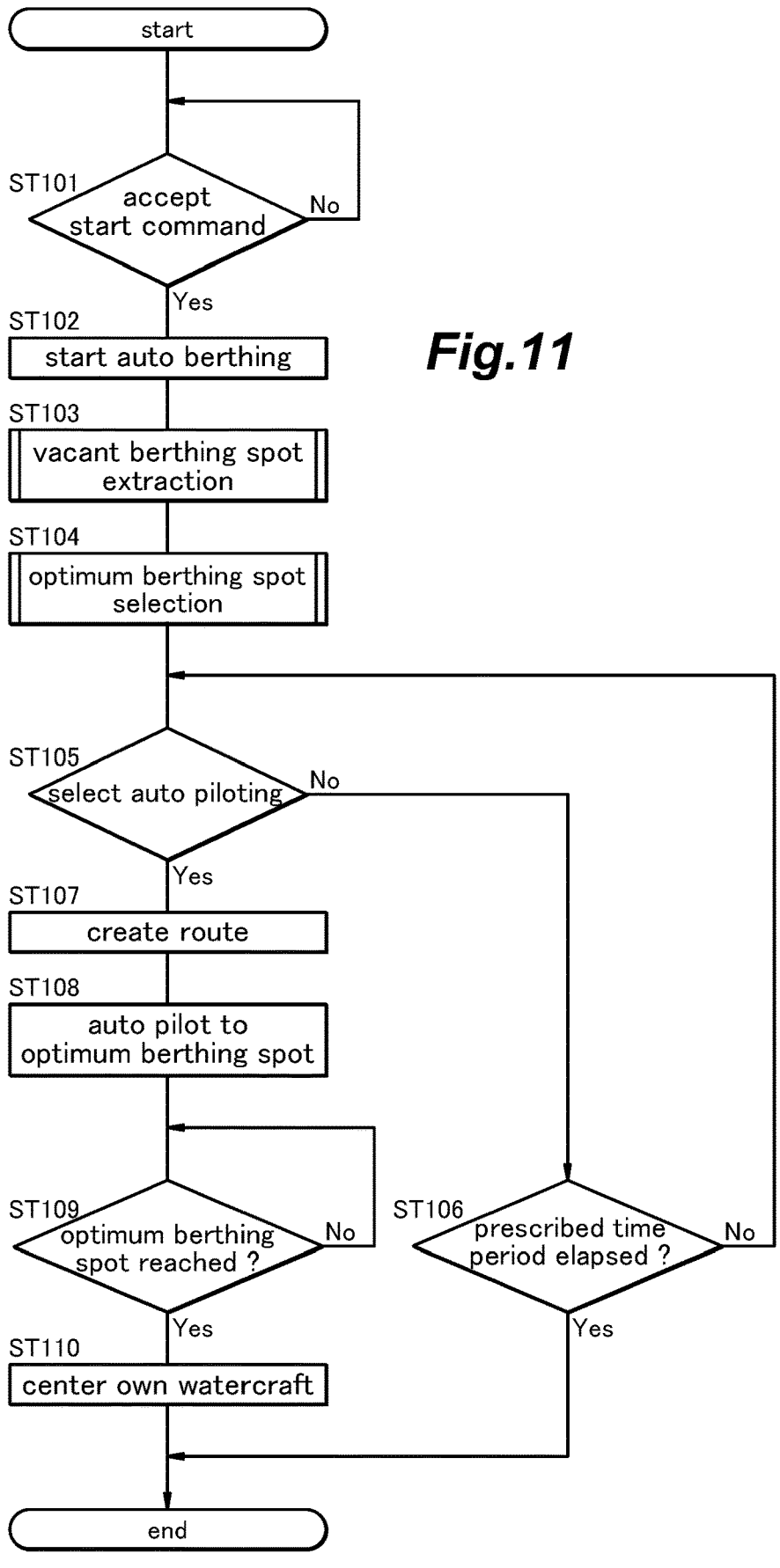
FIG. 11 is a flowchart of a process of automatic berthing/piloting performed by the automatic berthing/piloting system.

FIG. 11 is a flowchart showing the process of automatic berthing performed by the automatic berthing system 5 according to the present embodiment. Upon start-up, the processor 11 of the automatic berthing system 5 performs the automatic berthing process shown in FIG. 11. The processor 11 cyclically performs the automatic berthing process routine shown in FIG. 11 at predetermined control intervals.

The processor 11 determines if the automatic berthing start command has been received (step ST101). The automatic berthing system 5 is typically activated either automatically or manually when the own watercraft has arrived at a spot where most part of the marina or any other mooring facility comes within the view of the user. If no start command is received (ST101: No), this step is repeated. When the automatic berthing start command is received (ST101: Yes), the processor 11 starts the automatic berthing process (step ST102).

When the automatic berthing process is started, the processor 11 performs a vacant berthing spot extraction process in step ST103 to extract vacant berthing spots or berthing spot candidates.

Figure 12:
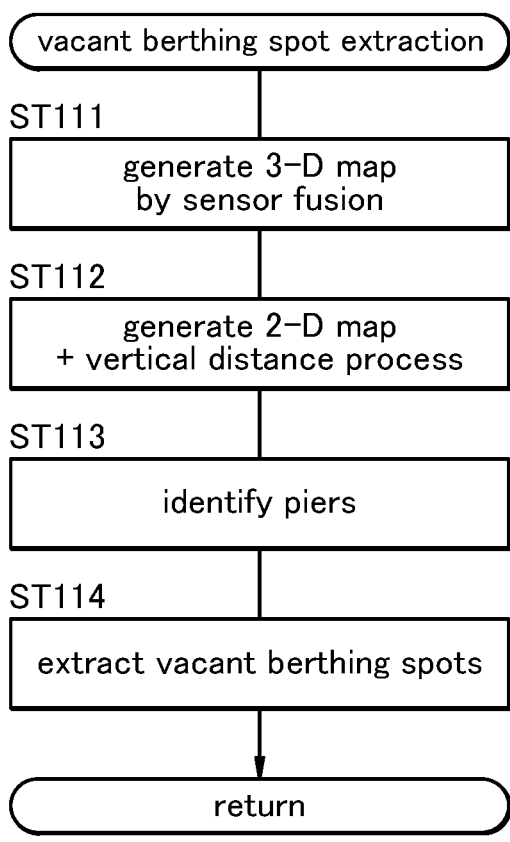
FIG. 12 is a flowchart showing the process of extracting vacant berthing spots.

The flowchart of FIG. 12 shows the vacant berthing spot extraction process. By making use of the external sensor group 6, the processor 11 creates a three-dimensional map of the mooring facility in step ST111. A sensor fusion technique may be used in this process by using data obtained from the various sensors belonging to the external sensor group 6. Further, map information which may consist of satellite map may be referred to when creating the three-dimensional map. The map information may be outdated. Therefore, the map information may be utilized to the extent it does not contradict the data obtained by the external sensor group 6. Then, the three-dimensional map is converted into a two-dimensional map in step ST112. At this time, a vertical distance process is also performed. The two-dimensional map essentially provides a top view of the mooring facility. The vertical distance process eliminates any overhead structures which are greater in height than the height of the own watercraft which may be entered from the input unit 23 or pre-registered in the control unit 10. As a result, roofs, cranes or any other overhead structures which do not obstruct the passage of the own watercraft are eliminated from the two-dimensional map. In evaluating the height of an overhead structure, the changing time has to be taken into account. If there is not an adequate margin in the height, the overhead structure may interfere with the own watercraft due to a rising tide. Therefore, in evaluating the height of an overhead structure, the future change in the tide should be taken into account.

Thereafter, piers P are identified from the objects appearing on the two-dimensional map in step ST113. At this time, wall structure, breakwaters or any other tall objects which obstruct the passage of the own watercraft, and are therefore not suitable for berthing are eliminated in this identification process. Thereafter, vacant regions along the piers P are extracted as vacant berthing spots in step ST114. At this time, regions occupied by other watercraft are eliminated in this extraction process.

Figure 14:
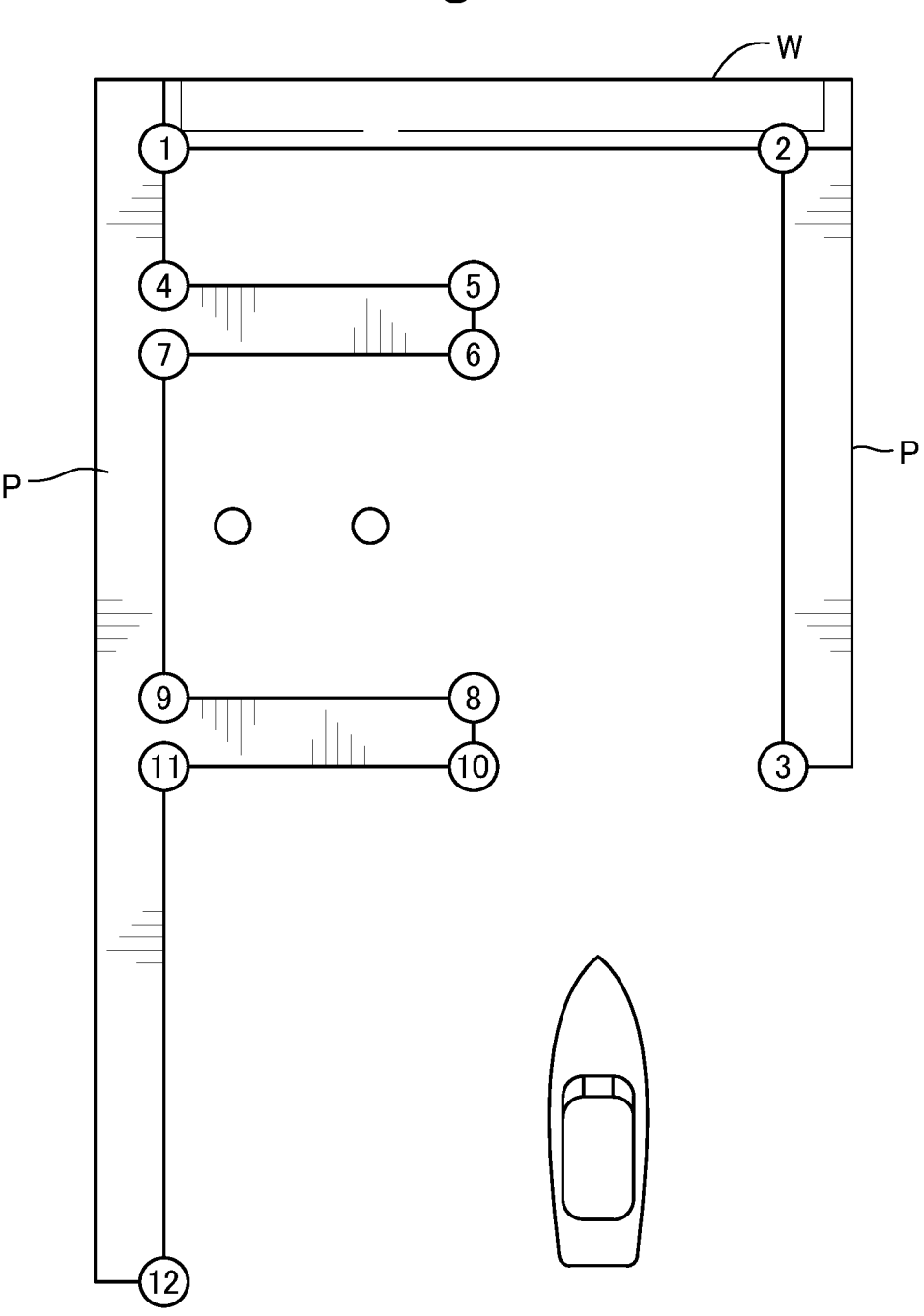
FIG. 14 is a simplified top view illustrating the process of detecting objects around the watercraft.
Figure 15:
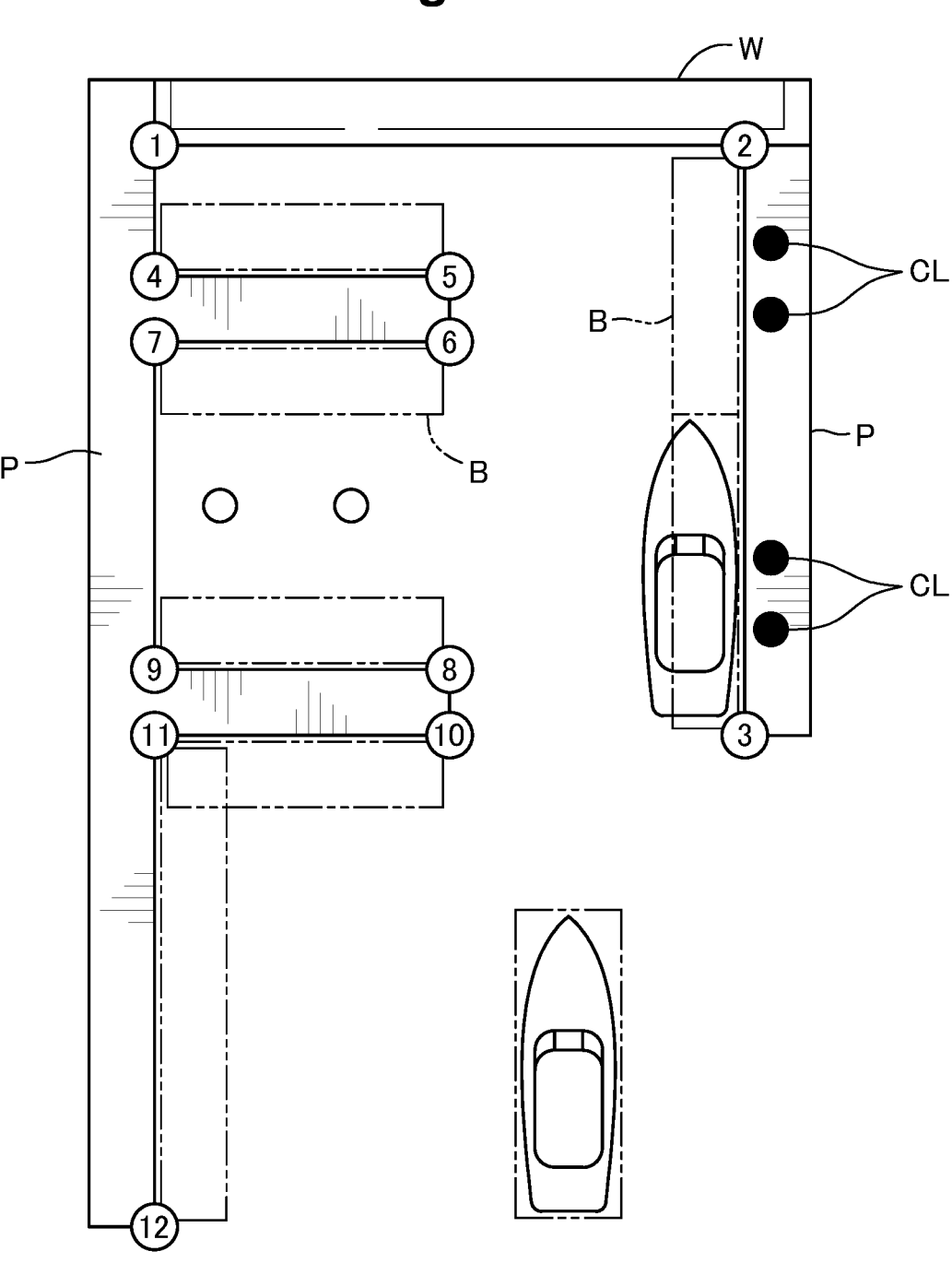
FIG. 15 is a simplified top view illustrating the process of extracting vacant berthing spots.

As shown in FIG. 14 which shows an example of the two-dimensional map, the processor 11 extracts corner points indicated by circled numerals, and identifies the piers P, and the regions along the piers P are identified as vacant berthing spots. As shown in FIG. 15, the berthing spots are extracted as bounding boxes B as indicated by the double-dot chain lines so that the algorithm for detecting berthing spots may be simplified, and mooring poles and other small isolated obstacles 34 may be accurately distinguished. Furthermore, the parts of the body of water along the piers P which are occupied by other watercraft are excluded in the extraction of the vacant berthing spots. The width and length of each bounding box B are required to be larger than those of the own watercraft. Therefore, the control unit 10 may be configured to accept the width and length of the bounding box B which are selected by the user, or may prepare a plurality of sizes stored therein for the user to select an appropriate one therefrom. Further, the control unit 10 may be configured to detect mooring equipment such as mooring cleats CL as markers for extracting the bounding boxes B or vacant mooring spots.

In this process, the three-dimensional map is also referred to so that a wall W is distinguished from a pier P, and the regions next to the wall W are excluded in the extraction of vacant berthing spots. Berthing spots may be covered by a roof, or a crane or other overhead structures may be located near the berthing spots. Since these structures do not prevent berthing of watercraft, such structures may be required to be properly taken into account.

Figure 16:
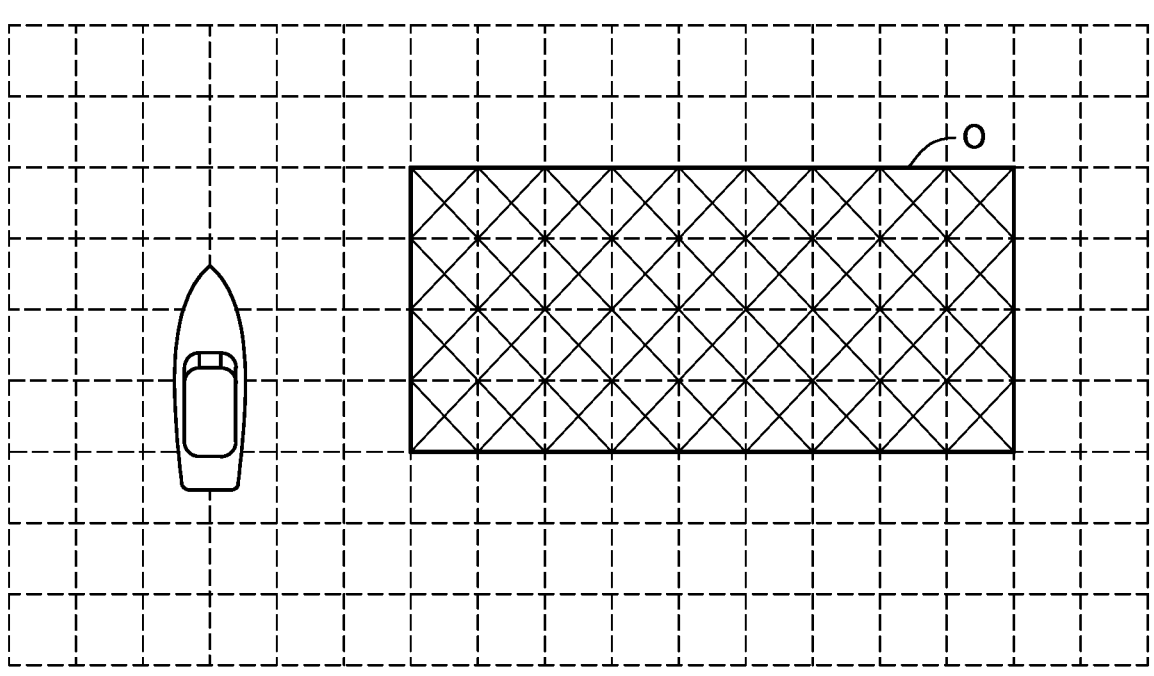
FIG. 16 is a simplified top view of the detected object before a vertical distance process.
Figure 17:
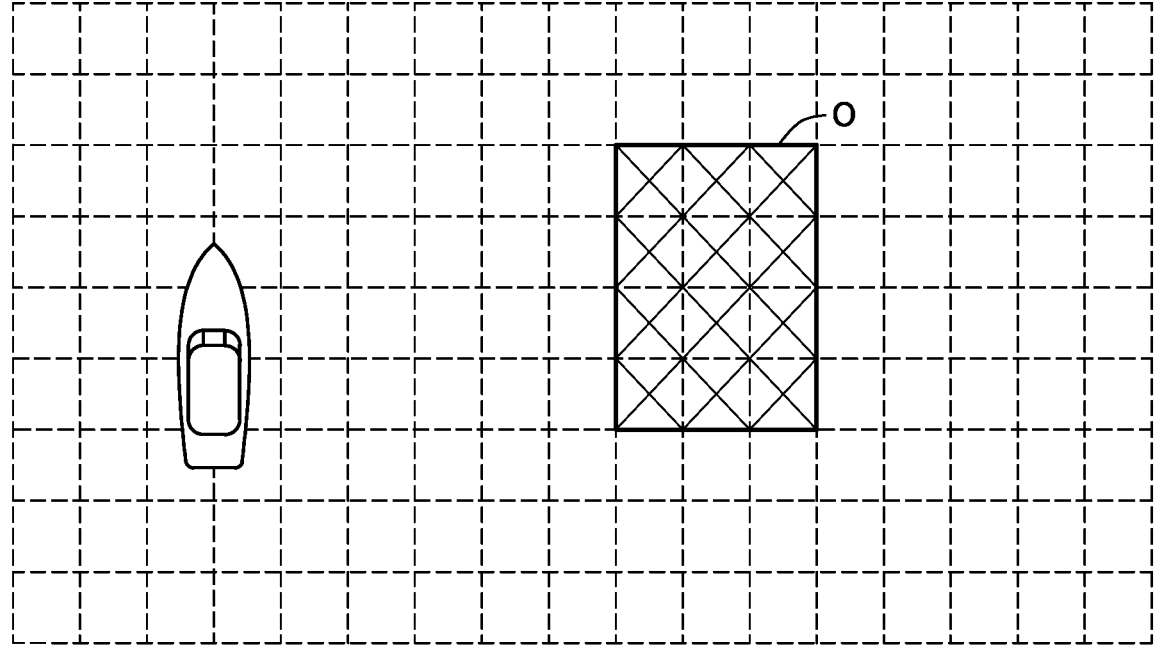
FIG. 17 is a simplified top view of an object after the vertical distance process.
Figure 18:
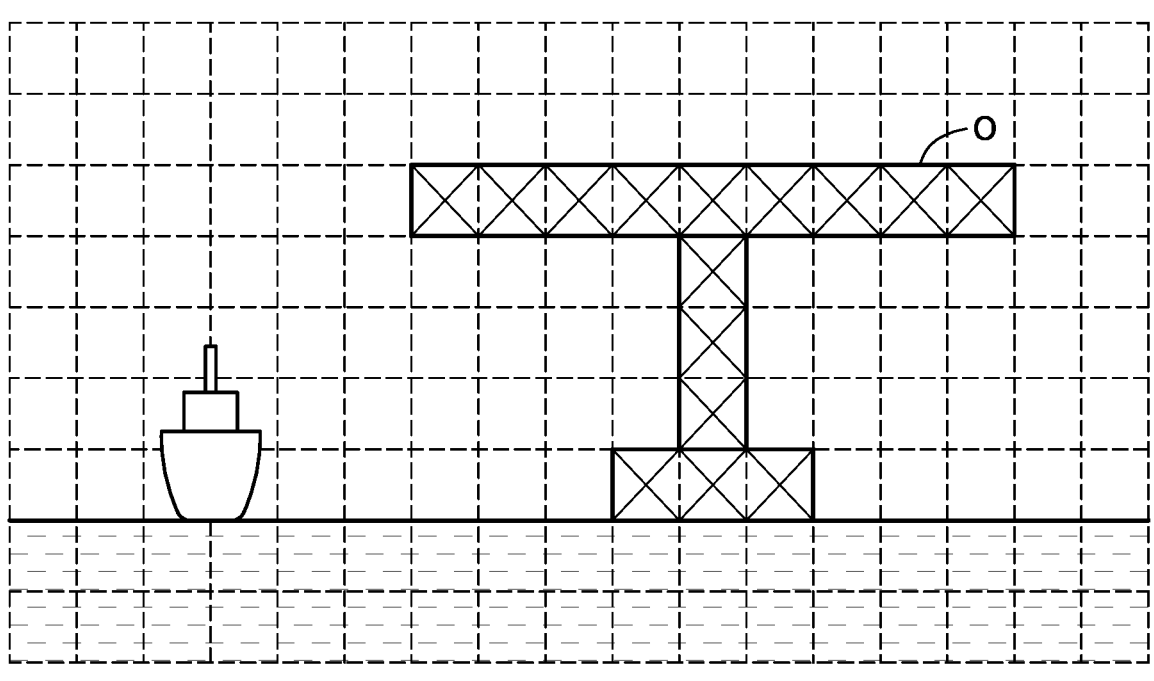
FIG. 18 is a simplified side view of a detected object.

FIGS. 16 to 18 show an overhead structure consisting of a roof O which extends above berthing spots, and in no way prevent berthing of watercraft thereunder. Although the roof O appears to prevent berthing of watercraft in simple top view (FIG. 16), the two-dimensional top view obtained from the three-dimensional map with the vertical distance process (FIG. 17) removes the roof O from the obstacles 34 that prevent the passage of watercraft. As a result, only the footing of the roof O is identified as an obstacle 34 which the own watercraft should avoid.

Figure 13:
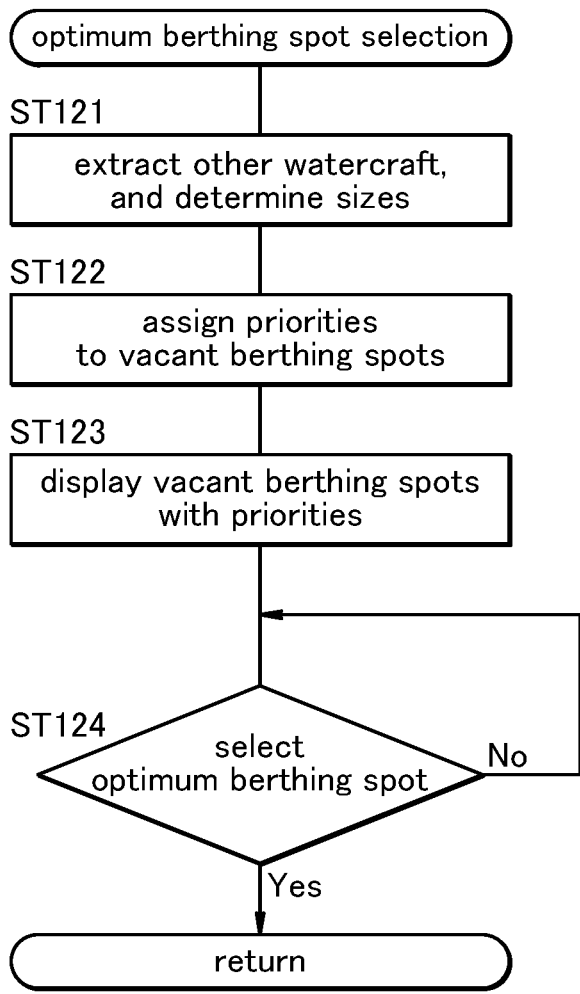
FIG. 13 is a flowchart showing the process of selecting an optimum berthing spot.

Upon completion of the vacant berthing spot extracting process, an optimum berthing spot selection process is executed in step ST104 to select an optimum berthing spot from the vacant berthing spots. The flowchart of FIG. 13 shows the optimum berthing spot selection process. Mooring facilities often have multiple piers P which are allocated to watercraft of different sizes. When there are multiple choices of berthing spots, a comparatively small berthing spot that suits the own watercraft should be selected, instead of an oversized berthing spot.

In the optimum berthing spot selection process, the sizes of other watercraft moored to different piers P are determined in step ST121 so that the piers P may be classified according to the sizes of the watercraft moored thereto. Then, different priorities are assigned to different piers P and different berthing spots in step ST122. The priorities may take into account not only the sizes of the berthing spots but also the nearness to the clubhouse and other land facilities.

The vacant berthing spots or available berthing spots are displayed on the display 17 in step ST123. This display may include the positions of the available berthing spots on the two-dimensional map, and the priority levels. The processor 11 then waits for the user to select the optimum berthing spot on the display 17 or the input unit 23 (step ST124: No). When selecting the optimum berthing spot, the heading of the own watercraft at the optimum berthing spot may be designated from the display 17 or the input unit 23 in step ST124. Once this selection is made (step ST124: Yes), the program flow returns to the main control routine.

Then, the processor 11 shows a display inquiring if an automatic piloting to the selected berthing spot is desired in step ST105, and waiting for the input from the user (ST105: No and ST106: No). If the user does not select automatic piloting by failing to answer the inquiry for a prescribed time period, the program flow comes to an end (ST105: No and ST106: Yes). In this case, the user navigates the own watercraft manually.

Figure 19:
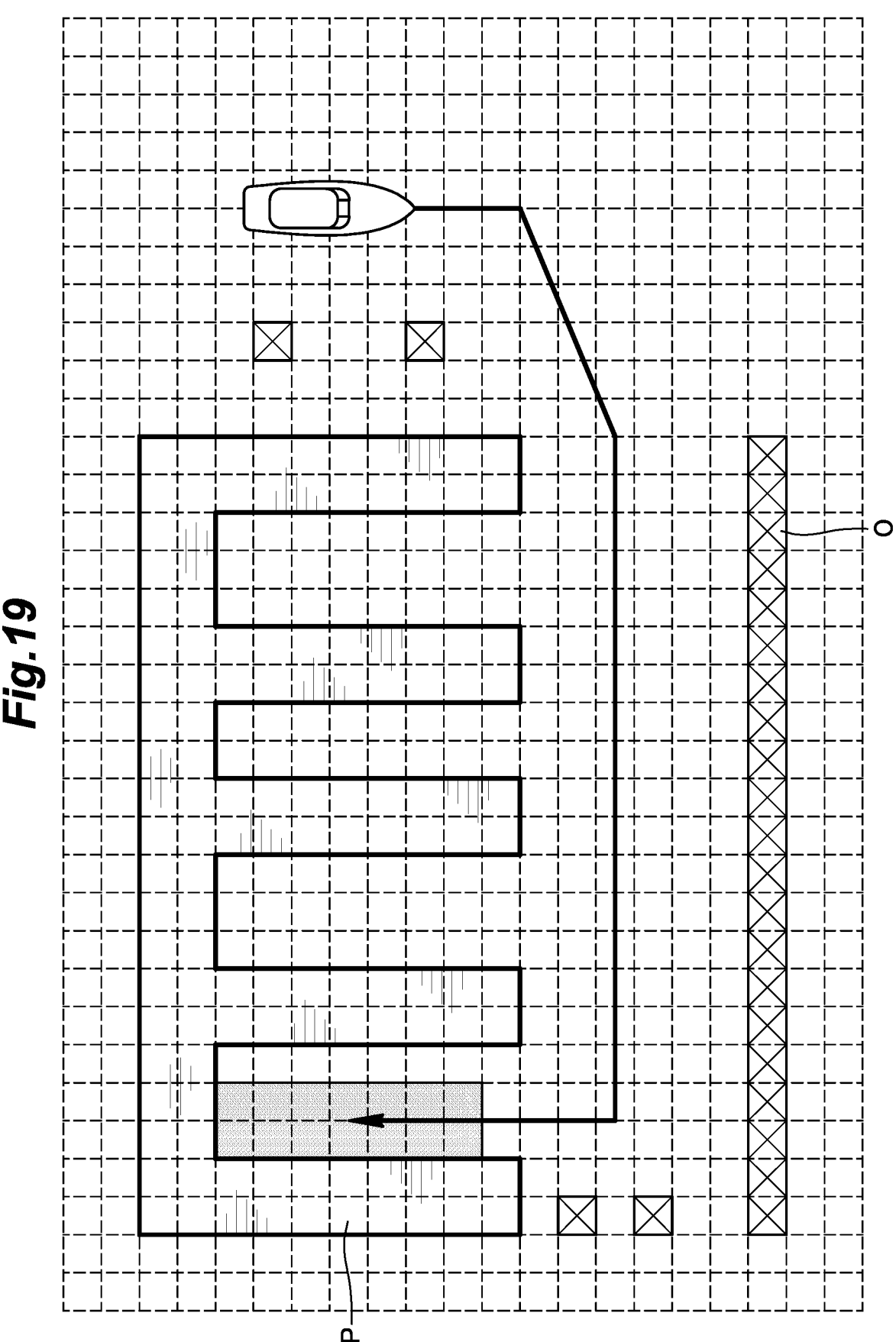
FIG. 19 is a view of a display in auto-piloting watercraft.

When an automatic piloting is selected by making a suitable input to the input unit 23 within the prescribed time period (ST105: Yes), an automatic piloting system to the selected optimum berthing spot is started. As an initial step of automatic piloting, a route from the current position to the optimum berthing spot is computed by the control unit 10 based on the data provided by the GNSS 21 in step ST107. The processor 11 then navigates the watercraft from the current position to the selected optimum berthing spot by controlling the watercraft operating device 9 in step ST108 as shown in FIG. 19.

Figure 20:
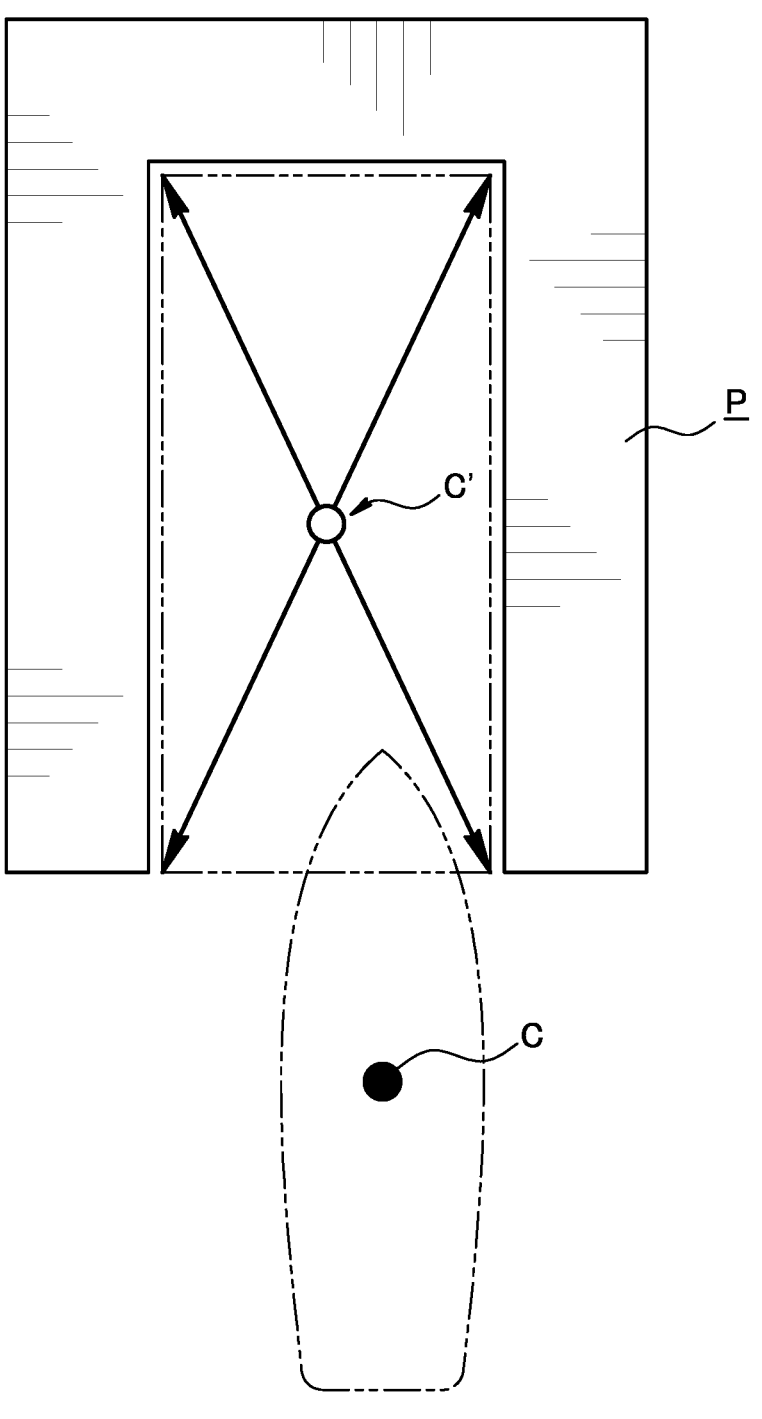
FIG. 20 is a simplified top view showing the process of maintaining the watercraft at a prescribed spot.

This step is continued until the watercraft reaches the optimum berthing spot (ST109: No). Once the watercraft reaches the optimum berthing spot (ST109: Yes), the control unit is in 10 positions and maintains the own watercraft at the selected optimum berthing spot step ST110 so that the user may moor the watercraft to the pier P, and embark/disembark the watercraft in a comfortable manner. This can be accomplished by designating the centers C and C' of the own watercraft and the selected berthing spot, and controlling the watercraft in such a manner that the two centers C and C' coincide with each other by a feedback control as shown in FIG. 20. In particular, according to the system of the present invention, since the position of the sensor relative to the watercraft is known, the piloting of the watercraft, and the identification of the position of the own watercraft can be performed in an improved accuracy.

Second Embodiment

Figure 21:
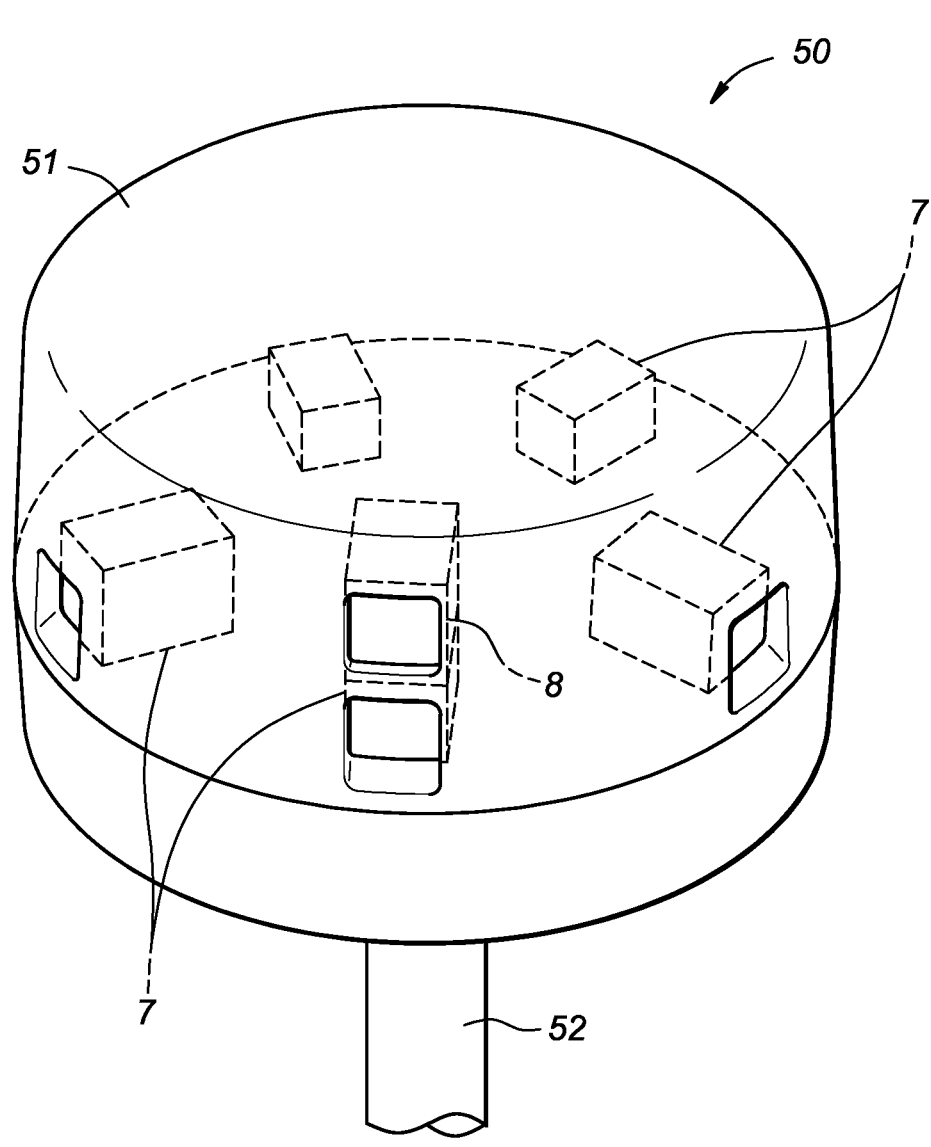
FIG. 21 is a see-through perspective view of a sensor module according to a second embodiment of the present invention.
Figure 22:
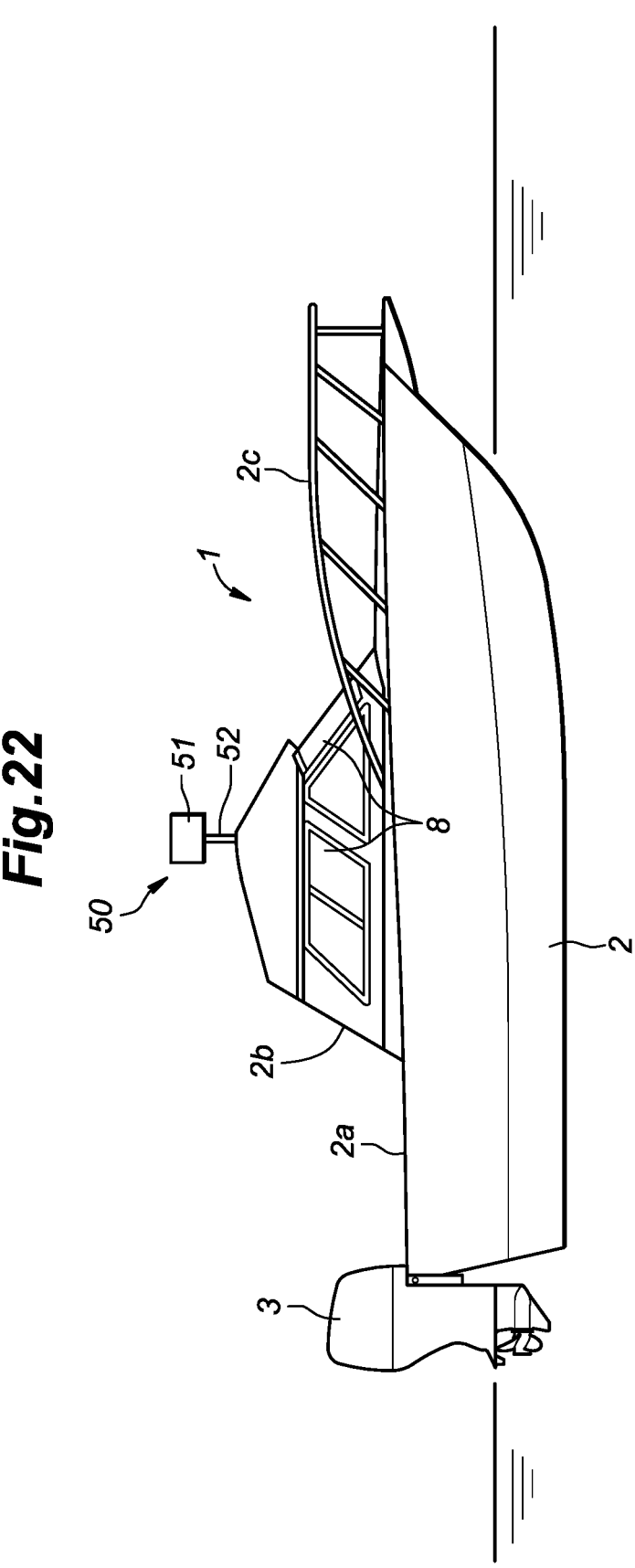
FIG. 22 is a side view of a boat on which the sensor module of the second embodiment is mounted.

Next, a second embodiment of the present invention will be described in the following with reference to FIGS. 21 and 22. In FIGS. 21 and 22, the parts corresponding to those of the previous embodiment are denoted with like numerals without necessarily repeating the description of such parts to avoid redundancy.

As shown in FIG. 21, in this embodiment, the external sensor group 6 is integrated into an external sensor unit 50 that incorporates a plurality of LIDARs 7 and a camera 8 into a single unit. More specifically, the external sensor unit 50 is provided with a housing 51 having a short cylindrical configuration, and a vertical central axis. The housing 51 receives five LIDARs 7 arranged at approximately equal intervals in the circumferential direction so as to face the radial direction, and one camera 8 is positioned on top of one of the LIDARs 7. Therefore, the relative positions of the camera 8 and the LIDARs 7 are predetermined.

As shown in FIG. 22, the external sensor unit 50 is mounted on top of a pole 52 erected upward from the top of the cabin 2*b* so that the external sensor unit 50 is positioned way higher than the deck 2*a* of the hull 2. The camera 8 as well the LIDAR 7 provided immediately under the camera 8 is positioned so as to face the forward direction.

The LIDARs 7 are placed in the housing 51 in predetermined positions, and with predetermined orientations. Information regarding the positions and orientation relative to the housing 51 is stored in the storage device 13 according to the particular specifications of the external sensor unit 50.

In this embodiment, in the sensor calibration process shown in FIG. 6, the bow determination in step ST11 is performed only for the primary LIDAR 7A provided so as to face the bow 1*a* along with the associated camera 8. Since the positions and orientations of the other sensors relative to the primary LIDAR 7A are known, step ST13 may be omitted, but the calibration process can be performed in an otherwise similar manner as the first embodiment.

The present invention has been described with reference to specific embodiments, but is not limited to the above embodiments, and can be modified without departing from the scope of the present invention. Not all of the components shown in the above embodiment are essential to the broad concept of the present invention, and may be appropriately selected, omitted, or substituted within the scope of the present invention.

The invention claimed is:

1. A sensor calibration system for a watercraft, comprising:
   a primary environment sensor configured to detect an external object including a first region of the watercraft and a distance to the external object, and mounted to a part higher than a deck of a hull of the watercraft; and
   a processor for processing an output of the primary environment sensor, wherein the processor is configured to;
      accept hull information including a length, a width, and a height of the watercraft;
      identify a bow of the watercraft from only a predetermined height range from the primary environment sensor, within which an outer edge of the hull of the watercraft is expected to be located, from the output of the primary environment sensor based on the height of the watercraft; and
      determine and calibrate installation position information of the primary environment sensor, the installation position information including a longitudinal distance from the bow to the primary environment sensor, a lateral distance from a longitudinal center line of the hull of the watercraft to the primary environment sensor, and a lateral angle of the primary environment sensor, based on the hull information and the output of the primary environment sensor.

2. The sensor calibration system for a watercraft according to claim 1, wherein the primary environment sensor includes at least one of an image sensor and a LIDAR.

3. The sensor calibration system for a watercraft according to claim 1, further comprising a secondary environment sensor positioned so as to detect a second region of the watercraft including a portion that overlaps with the first region of the watercraft detected by the primary environment sensor.

4. The sensor calibration system for a watercraft according to claim 1, further comprising a pair of secondary environment sensors positioned on either side of the primary environment sensor,
   wherein each of the pair of secondary environment sensors is configured to detect a respective second region of the watercraft, and
   wherein the respective second regions include portions that are common to the first region of the watercraft detected by the primary environment sensor.

5. The sensor calibration system for a watercraft according to claim 3, wherein the first region of the watercraft detected by the primary environment sensor and the second region of the watercraft detected by the secondary environment sensor include the outer edge of the hull of the watercraft.

6. The sensor calibration system for a watercraft according to claim 1, wherein the processor is configured to detect an outwardly bulging portion of the outer edge of the hull of the watercraft as the bow.

7. The sensor calibration system for a watercraft according to claim 1, wherein the processor is configured to detect a symmetrically tapered portion of the outer edge of the hull of the watercraft as the bow.

8. The sensor calibration system for a watercraft according to claim 1, wherein the processor is configured to detect a middle point of a laterally extending linear portion of the outer edge of the hull of the watercraft as the bow.

9. The sensor calibration system for a watercraft according to claim 1, wherein the processor is configured to analyze a shape of the outer edge of the hull of the watercraft and detect the bow according to a knowledge database.

10. The sensor calibration system for a watercraft according to claim 1, wherein the processor is configured to create an environment map of an area surrounding the watercraft based on the output of the primary environment sensor.

11. A watercraft provided with the sensor calibration system according to claim 1.

\* \* \* \* \*